United States Patent [19]

Helser

[11] 4,402,892
[45] Sep. 6, 1983

[54] METHOD FOR MAKING XONOTLITE INSULATION BY FOAMING AN AQUEOUS SLURRY OF CALCAREOUS AND SILICEOUS REACTANTS AND CELLULOSIC AND GLASS FIBERS

[75] Inventor: Jerry L. Helser, Hebron, Ohio

[73] Assignee: Owens-Corning Fiberglas Corporation, Toledo, Ohio

[21] Appl. No.: 197,298

[22] Filed: Oct. 15, 1980

[51] Int. Cl.³ .............................................. B28B 1/26
[52] U.S. Cl. .................................... 264/42; 264/45.3; 264/82; 264/333
[58] Field of Search ................... 264/42, 45.3, 333, 82

[56] References Cited

U.S. PATENT DOCUMENTS

| 3,257,220 | 6/1966 | Kolousek | 264/333 |
| 4,193,958 | 3/1980 | Uchida et al. | 264/333 |
| 4,263,365 | 4/1981 | Burgesss | 264/42 |

Primary Examiner—John A. Parrish
Attorney, Agent, or Firm—Ronald C. Hudgens; Philip R. Cloutier; James B. Wilkens

[57] ABSTRACT

Rigid cellular hydrous calcium silicate thermal insulating product of low density can be made by aerating an aqueous slurry containing reactive calcareous and siliceous materials, preferably in conjunction with the incorporation of a foaming agent in the slurry, and then indurating the aerated slurry by the application of heat and pressure.

7 Claims, No Drawings

METHOD FOR MAKING XONOTLITE INSULATION BY FOAMING AN AQUEOUS SLURRY OF CALCAREOUS AND SILICEOUS REACTANTS AND CELLULOSIC AND GLASS FIBERS

TECHNICAL FIELD

The present invention relates to the field of thermal insulating materials and more particularly to a method for producing bodies of cellular hydrous calcium silicate insulating material having unusual combinations of apparent density, mechanical properties and thermal characteristics.

BACKGROUND ART

Aqueous slurries of reactive calcareous and siliceous materials in appropriate proportions will react under certain conditions of temperature and pressure to form various crystalline hydrous calcium silicates. When small proportions of suitable fibrous materials, such as certain types of asbestos or cellulosic fibers, are present these crystals can be made to deposit from the reactive slurry as a rigid mass of interlocking crystals from which excess water can be removed to leave a dried polycrystalline body having a substantial proportion of its volume comprised of intersticial voids. When properly controlled, such processes can produce polycrystalline bodies in which the thermal conductivity is sufficiently low by virtue of the small size and uniform distribution at the intersticial voids and in which the mechanical strength and rigidity are sufficiently high by virtue of the interlocking of the crystals that the product is useful as thermal insulating material. Various fillers, reinforcements and/or opacifiers can also be incorporated.

The properties of such thermal insulating materials, and in particular the upper temperature limits at which they can be used in practice, will depend in considerable part on the chemical composition and crystalline form of the hydrous calcium silicate, e.g., tobermorite or xonotlite. For the highest use temperatures it is desirable that the hydrous calcium silicate in the final product be principally in the form of xonotlite crystals. The selection of the reactive calcareous and siliceous materials, their relative proportions and the reaction conditions for obtaining predominantly one or another of the various crystalline hydrous calcium silicates are well known in the art.

The apparent density of the final product has in the past been controlled largely by regulating the proportion of water in the aqueous slurry when the induration of the material commences since, except for the water of hydration incorporated in the hydrous calcium silicate, the water is ordinarily removed from the product after its induration to final rigid shape and size. In some processes (so-called filter press processes), a portion of the aqueous slurry medium is expressed from the reactive mixture at an intermediate stage where sufficient reaction has taken place to produce a self-supporting but compressible gel. In such processes the proportion of water determinative of the final apparent density of the product has been that remaining after the portion to be pressed out from this intermediate gel was expressed therefrom. In another class of processes (so-called pan or casting processes), the slurry is merely poured into pan molds of the desired shape and indurated under the appropriate conditions, the final apparent density being largely determined by the proportion of water orginally present in the reactive slurry.

DISCLOSURE OF THE INVENTION AND THE BEST MODE FOR CARRYING IT OUT

The present invention provides a process whereby bodies of hydrous calcium silicate thermal insulating material having different combinations of apparent density, thermal characteristics and mechanical properties than prior art hydrous calcium silicate materials can be produced. This process is simple, economical and readily controllable and is, therefore, well adapted to commercial production. The products of this process are useful as high temperature thermal insulation and particularly as fire resistant insulating cores for structural panels and doors.

Accordingly, the present invention comprises a method for making a rigid cellular asbestos-free body of hydrous calcium silicate thermal insulation comprising the steps of (a) aerating an aqueous cementitious slurry comprising calcareous and siliceous materials mutually reactable to yield hydrous calcium silicate, cellulosic fibers and glass fibers to form a fluent foamed slurry; (b) charging at least a portion of said foamed slurry into a mold cavity; and (c) indurating the foamed slurry in said mold cavity under conditions of temperature and steam pressure effective to transform said calcareous and siliceous materials into cellular hydrous calcium silicate. Preferably the composition of the slurry and the conditions of induration are selected to produce hydrous calcium silicate predominantly in the form of xonotlite.

The calcareous and siliceous materials employed in the process of this invention can be selected from a wide variety of reactive minerals according to availability, price and the properties desired in the final product, the influence of the selection of raw materials on the properties of the product being generally in accord with the extensive prior knowledge in this art. Thus where a product is desired in which the hydrous calcium silicate is predominantly in the form of xonotlite, calcareous and siliceous raw materials containing as low levels as possible of available aluminum ions and other interfering components should be selected. On the other hand, where a predominantly tobermorite product is desired, much less care in excluding such contaminants will be required. To produce products according to the present invention in which either xonotlite or tobermorite are the predominant forms of hydrous calcium silicate, the relative proportions of the reactive calcareous and siliceous materials and the indurating conditions must also be appropriately selected and controlled.

The aqueous slurry of reactive calcareous and siliceous materials can be produced by entirely conventional methods. Preferably, the calcareous material (e.g., quicklime) is first stirred into a portion of the water and allowed to slake, following which the remainder of the water, the cellulosic fibers, the siliceous material (e.g., diatomaceous earth for tobermorite or silica for xonotlite products) and the glass fibers are successively added to the mixture.

The ratio of reactive calcareous material to reactive siliceous material in the aqueous slurry can vary over a fairly wide range, but will preferably be from about 0.65 to about 1.25 expressed as the mol ratio of available CaO to available $SiO_2$. Where a product having hydrous calcium silicate predominantly in the form of tobermorite is desired, this ratio should preferably be not greater than about 1 and should more preferably be approximately 0.8. Where a product having hydrous calcium silicate predominantly in the form of xonotlite is desired, this ratio should preferably be at least about 0.9 and should more preferably be approximately 1. The total amount of available CaO and SiO₂ in the aqueous slurry can also vary over a wide range, but should preferably be from about 50 to about 99, and more preferably from about 80 to about 95, percent by weight of the total solids in the slurry.

The cellulosic fiber component of the aqueous slurry can be, for example, rayon or regenerated cellulose fibers, cotton or other natural fibers, etc., but preferably will be wood pulp. Suitable non-cellulosic fibers, such as polyester fibers, can be substituted for the cellulosic fibers. The proportion of cellulose fibers can vary over a wide range, but from about 1 to about 10 percent by weight of the total solids is preferred and from about 2 to about 5 weight percent of the total solids is especially preferred.

The glass fiber component of the aqueous slurry should preferably be alkali resistant glass fibers, which are well known in the art and readily available. Such fibers typically have a higher content of zirconia or similar material than do ordinary glass fibers. It is also preferred that the glass fibers be lightly coated with a sizing composition which will typically comprise a film forming resin, a lubricant such as wax or an oil, and a glass-resin coupling agent such as an organosilane. The proportion of glass fibers can vary over a wide range, but from about 1 to about 5 percent by weight of the total solids in the aqueous slurry is preferred. From about 2 to about 3 percent by weight of the total solids is especially preferred. The glass fibers can be of almost any length desired, but preferably should be from about ¼ inch to about 2 inches, and more preferably from about ½ inch to about 1-½ inches, in length. They can be present either as multifilament bundles or, preferably, as discrete individual filaments.

Various inert fillers, such as vermiculite, perlite, etc., may be included in the aqueous slurry. Opacifiers such as iron chromite, mica, etc., may also be included. However, asbestos fibers should be excluded since they are now suspected of presenting a hazard to workers under some circumstances.

The aqueous slurry is then aerated to form a fluent foamed slurry. This can be accomplished by adding an aqueous solution of an organic foaming agent such as a soap or other similar material to the aqueous cementitious slurry and aerating that mixture, for example, by vigorous mechanical agitation to entrain air therein or by pumping air under pressure into the mixture of the cementitious slurry and the foaming agent solution. Alternatively, the foaming agent solution can be pre-foamed and then mixed into the aqueous cementitious slurry to aerate the mixture, thereby forming an aqueous foamed slurry.

A convenient technique is to supply the foaming agent solution and compressed air through separate feed lines into one end of a simple elongated mixing head, preferably packed loosely with inert spheres or other shapes to induce turbulent intermixing thereof so as to aerate the solution to form an aqueous foam therefrom. This foam can then be deposited directly from the mixing head into the aqueous cementitious slurry.

The foaming agent can be any of a wide variety of organic surfactants, such as soaps, synthetic detergents, etc. The foaming agent can be diluted with water to form an aqueous solution before mixing with the aqueous cementitious slurry. The concentration of foaming agent in such a solution can vary widely, but concentrations from about 1 to about 20 percent by weight are preferred, with concentrations from about 5 to about 10 percent by weight being especially preferred.

The relative proportions of the foaming agent or foaming agent solution and the aqueous cementitious slurry can vary widely and will ordinarily have to be adjusted, in concert with the amount of air incorporated during aeration, to give a product having the desired apparent density or other properties. It has been found that advantageous combinations of properties in the final product can usually be achieved by adjusting the proportion of foaming agent and the amount of aeration so that the apparent density of the final product is from about 30 to about 85 percent of the apparent density that a product made from the same aqueous slurry employing a similar induration schedule, but without aeration, would have. An amount of aqueous foaming solution corresponding to a ratio of the weight of foaming agent to the weight of solid components of the aqueous cementitious slurry of about 0.03 to 0.05:1 has been found to be generally advantageous, although greater or smaller proportions of foaming agent may sometimes be found satisfactory. Where products having hydrous calcium silicate predominantly in the form of xonotlite are to be made, it is preferred that the total amount of water, including the water added with the foaming agent, be not greater than about 4 times the total weight of solids in the aerated cementitious slurry.

The fluent foamed slurry can be transferred into pan molds and indurated under conditions of temperature and steam pressure effective to transform the calcareous and siliceous materials therein into hydrous calcium silicate predominantly in the form of xonotlite.

EXAMPLE 1

An aqueous cementitious slurry having a water to solid ratio of 1.9:1 by weight was prepared from the following materials:

|  | Weight % |
|---|---|
| Quick lime | 47.06 |
| Tripoli | 47.06 |
| Redwood pulp | 3.92 |
| 1 inch glass fiber | 1.96 |

The quick lime was slaked with 3 times its weight of water at about 100°–120° F. for about 10 minutes then the balance of the water was added. The pulp and tripoli were then successively added and stirred in for about 3 minutes each with a high speed mixer. Then the glass fiber was added and stirred in for about 2 minutes at low speed.

An aqueous foaming composition was formed by diluting Elastizell (TM of Elastizell Corporation of America), a 60% solids aqueous foaming agent, with 6 parts by weight of water for each part by weight of the 60% Elastizell product. This solution was then pre-foamed by feeding it through a tubular foaming head with compressed air and the foaming so generated was directly mixed with the aqueous cementitious slurry previously prepared in a ratio of about 0.04 parts by weight of foaming agent solids to 1 part by weight solid material in the aqueous cementitious slurry.

The fluent foamed slurry so prepared was charged into large flat rectangular mold cavities to a depth of about 2 inches and cured in an autoclave at about 175-200 pounds per square inch of steam pressure for about 8 hours, following which the cured slabs were removed from the molds and then dried in an oven having high velocity air circulation at about 350° F. for 24 hours.

A second batch of slabs was made according to the same procedure except that the water solids ratio of the initial aqueous cementitious slurry was about 2.3:1 by weight and no foaming agent was incorporated therein.

The properties of these two products were found to be as follows:

|  | With foaming agent | Without foaming agent |
| --- | --- | --- |
| Calcium/silica mol ratio | 1.007 | 1.007 |
| Density | 19.4 lb/ft$^3$ | 26.4 lb/ft$^3$ |
| Flexural strength | 160 psi | 250 psi |

While the flexural strength of the product of the method of this invention is somewhat lower than that of the similar compounds or product made without foaming agent, this lower density product is entirely adequate for many thermal insulating uses and is less costly than the comparison product. Its lower density is also advantageous in many applications where supporting structures of lighter construction can correspondingly be employed.

It will be apparent that many variations in the invention as described can be made and such variations are contemplated as within the scope of the invention.

I claim:

1. A method for making a rigid cellular asbestos-free body of hydrous calcium silicate thermal insulation comprising the steps of:
   (a) aerating an aqueous cementitious slurry comprising calcareous and siliceous materials mutually reactable to yield hydrous calcium silicate predominantly in the form of xonotlite, cellulosic fibers and glass fibers to form a fluent foamed slurry;
   (b) charging at least a portion of said foamed slurry into a mold cavity; and
   (c) indurating the foamed slurry in said mold cavity under conditions of temperature and steam pressure effective to transform said calcareous and siliceous materials into cellular hydrous calcium silicate predominantly in the form of xonotlite.

2. A method according to claim 1 wherein an aqueous foaming composition comprising an organic foaming agent is incorporated into said aqueous cementitious slurry.

3. A method according to claim 2 wherein said aqueous foaming compositing is prefoamed before its incorporation into said aqueous cementitious slurry.

4. A method according to claim 2 wherein said glass fibers comprise sized fibers of alkali resistant glass substantially completely dispersed as discrete filaments in said aqueous cementitious slurry.

5. A method according to claim 2 wherein the aeration is sufficient to give an indurated product which, when dried of excess moisture, has an apparent density not greater than about 85 percent and a flexural strength not less than about 60 percent of the apparent density and flexural strength, respectively, of a product made according to a substantially identical method but omitting aeration of the aqueous cementitious slurry.

6. A method according to claim 5 wherein the mole ratio of available calcia to available silica in said aqueous cementitious slurry is at least about 0.9:1, the weight ratio of water to total solids in said aqueous cementitous slurry is not more than about 3:1, the weight ratio of water to total solids in said foamed slurry is not greater than about 4:1, the proportion of available aluminum ions in said foamed slurry is sufficiently low to not prevent the crystallization of hydrous calcium silicate as xonotlite, and the steam pressure is at least about $1.2 \times 10^6$ Pa for sufficient time during the induration step to crystallize the hydrous calcium silicate formed predominantly as xonotlite.

7. A method according to claim 6 wherein said aqueous foaming composition is prefoamed before its incorporation into said aqueous cementitious slurry.

* * * * *